United States Patent
Puri et al.

(10) Patent No.: US 7,185,243 B1
(45) Date of Patent: Feb. 27, 2007

(54) TESTING IMPLEMENTATION SUITABLE FOR BUILT-IN SELF-REPAIR (BISR) MEMORIES

(75) Inventors: Mukesh K. Puri, Fremont, CA (US); Ghasi R. Agrawal, San Jose, CA (US); Thompson W. Crosby, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 936 days.

(21) Appl. No.: 09/872,582

(22) Filed: Jun. 4, 2001

(51) Int. Cl.
*G11C 29/00* (2006.01)
*G11C 7/00* (2006.01)

(52) U.S. Cl. ...................... 714/718; 365/201
(58) Field of Classification Search ........ 714/718–723, 714/710–711; 365/200–201
See application file for complete search history.

(56) References Cited

U.S. PATENT DOCUMENTS

| | | | | |
|---|---|---|---|---|
| 4,344,155 A | * | 8/1982 | Mollier | 365/200 |
| 4,584,673 A | * | 4/1986 | Kuijk | 365/219 |
| 5,033,048 A | * | 7/1991 | Pierce et al. | 714/719 |
| 5,231,314 A | * | 7/1993 | Andrews | 327/153 |
| 5,815,512 A | * | 9/1998 | Osawa et al. | 714/726 |
| 6,065,134 A | * | 5/2000 | Bair et al. | 714/7 |
| 6,701,476 B2 | * | 3/2004 | Pouya et al. | 714/727 |

OTHER PUBLICATIONS

Abramovici et al. in "Digital Systems Testing and Testable Design" IEEE Press 1990.*

* cited by examiner

*Primary Examiner*—Cynthia Britt
(74) *Attorney, Agent, or Firm*—Maginot Moore & Beck, LLP

(57) ABSTRACT

A semiconductor memory testing implementation suitable for build-in self repair (BISR) memories provides, in one embodiment, a memory testing circuit configuration including an output register for receiving digital data. A plurality of shift registers serially output the digital data to be received by the output register. Each one of the plurality of shift registers includes a feedback path for enabling the digital data output by a corresponding one of the plurality of shift registers to be input back into the corresponding shift register in a same sequence as the digital data is output from the corresponding shift register.

16 Claims, 2 Drawing Sheets

TESTING IMPLEMENTATION SUITABLE FOR BUILT-IN SELF-REPAIR (BISR) MEMORIES

BACKGROUND OF THE INVENTION

1. Field of the Invention

The present invention relates generally to the testing of semiconductor memories, and more particularly to a testing implementation suitable for built-in self-repair (BISR) memories.

2. Description of the Related Art

Integrated circuits have become key components of many consumer and commercial electronic products, often replacing discrete components and enhancing functionality. The semiconductor processing technologies that produce these integrated circuits have advanced to the point where complete systems, including memories, can be reduced to a single integrated circuit or application specific integrated circuit (ASIC) device. It is a common practice for the manufacturers of such integrated circuits to thoroughly test device functionality at the manufacturing site. Because of the increasing complexity of new designs, test development costs can account for a large percentage of the total ASIC development cost.

Before integrated circuits (or "chips") are released for shipment by a manufacturer, the devices typically undergo a variety of testing procedures. In ASIC devices incorporating integrated memories, for example, specific tests are carried out to verify that each of the memory cells within the integrated memory array(s) is functioning properly. This testing is necessary because perfect yields are difficult to achieve. It is not uncommon for a certain percentage of unpackaged ASIC die to contain memory cells which fail testing processes, due largely to non-systemic manufacturing defects and degradation faults. Such manufacturing issues are likely to increase as process geometries continue to shrink and the density of memory cells increases.

A number of memory testing strategies have evolved. If an embedded memory is buried deeply within an ASIC, a built-in self-test (BIST) is often used by semiconductor vendors. BIST allows the memory to be tested quickly with a reasonably high degree of fault coverage, without requiring complex external test equipment and large amounts of external access circuitry. One advantage BIST has over many traditional testing methods is that with BIST, memory or logic circuitry can be tested at any time in the field. This capability offers some degree of continued fault protection. BIST refers in general to any test technique in which test vectors are generated internal to an integrated circuit or ASIC. Test vectors are sequences of signals that are applied to integrated circuitry to determine if the integrated circuitry is performing as designed. BIST can be used to test memories located anywhere on the ASIC without requiring dedicated input/output pins, and can be used to test memory or logic circuitry every time power is applied to the ASIC, thereby allowing an ASIC to be easily tested after it has been incorporated in an end product. A number of software tools exist for automatically generating BIST circuitry, including RAMBIST Builder by LSI Logic of Milpitas, Calif. Such software produces area-efficient BIST circuitry for testing memories, and reduces time-to-market and test development costs. In the BIST approach, a test pattern generator and test response analyzer are incorporated directly into the device to be tested. BIST operation is controlled by supplying an external clock and utilizing a simple commencement protocol. BIST test results are typically compressed—usually to the level of "passed" or "failed". At the end of a typical structured BIST test, or "run", a simple pass/fail signal is asserted, indicating whether the device passed or failed the test. Intermediate pass/fail signals may also be provided, allowing individual memory locations or group of locations to be analyzed. Unlike external testing approaches, at-speed testing with BIST is readily achieved. BIST also alleviates the need for long and convoluted test vectors and may function as a surrogate for functional testing or scan testing. Further, since the BIST structures remain active on the device, BIST can be employed at the board or system level to yield reduced system testing costs, and to reduce field diagnosis and repair costs.

In order to enhance the repair process, on-chip built-in self repair (BISR) circuitry for repairing faulty memory cells has evolved. BISR circuitry functions internal to the integrated circuit without detailed interaction with external test or repair equipment. In the BISR approach, suitable test algorithms are preferably developed and implemented in BIST or BIST-like circuitry. These test patterns may be capable of detecting stuck-at, stuck-open, and bridging faults during memory column tests, as well as memory cell faults and retention faults during memory row tests. Following execution of the test patterns, the BISR circuitry analyzes the BIST "signature" (results) and, in the event of detected faults, automatically reconfigures the defective memory utilizing redundant memory elements to replace the defective ones. A memory incorporating BISR is therefore defect-tolerant. The assignee of the present invention, LSI Logic Corporation, has addressed different methods of repairing faulty memory locations utilizing BIST and BISR circuitry. Some BISR circuits are capable of repairing the faulty memory locations by redirecting the original address locations of faulty memory lines to the mapped addressed locations of the redundant columns and rows. Options for repair include either row and column replacement when a bad bit is found in a particular row or column, or single bit replacement involving storing the addresses of bad bits in a content addressable memory. If faults are randomly distributed, single bit replacement may prove to be more space efficient. However, if faults are detected involving large areas of memory in the forms of rows or columns, replacement of entire rows or columns is preferable.

There are often problems in capturing repair information by testers based upon how the error capture mode of the tester is set up. In some testers, when a functional error is observed, the tester starts over and incrementally captures the errors. In other words, once the tester observes a first failure, it stops the functional burst, goes into an error capture mode and loops back to the beginning of the test and starts over again. Thereafter, the test pattern can have multiple loop-backs based on the size of the pattern and the number of failing vectors. If the registers of all the BISR memories are connected into one scan chain (i.e., connected serially), the error capture of the test device results in incorrect information being scanned out. In particular, once the first error is encountered, the tester restarts the pattern at the beginning, but the internal information has changed because of the sequential progression of data through the scan chain. This limitation does not allow the flare registers to be connected serially. One potential solution to this limitation is to utilize parallel load registers for each register which could be loaded, and then strobed to examine the results. This approach, however, is unacceptable since it increases the BISR gate count by nearly 15%. Another alternative is to use parallel loading of the output register; however, this can cause routing congestion if there are many BISR memories in the design. Accordingly, there is a need for a testing implementation suitable for BISR memories which addresses these and other problems.

SUMMARY OF THE INVENTION

The present invention provides a circuit configuration for testing a semiconductor memory, such as a BISR memory. According to an embodiment, the circuit configuration includes an output register for receiving digital data. A plurality of shift registers serially output the digital data to be received by the output register. Each one of the plurality of shift registers includes a feedback path for enabling the digital data output by a corresponding one of the plurality of shift registers to be input back into the corresponding shift register in a same sequence as the digital data is output from the corresponding shift register. A multiplexer is interposed between the output register and the plurality of shift registers. An output pin is strobed to examine contents of the output register. According to a preferred embodiment, each one of the plurality of shift registers has a different bit storage capacity, and the output register has a bit storage capacity equal to a bit storage capacity of the largest shift register.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE INVENTION

Figure 1:
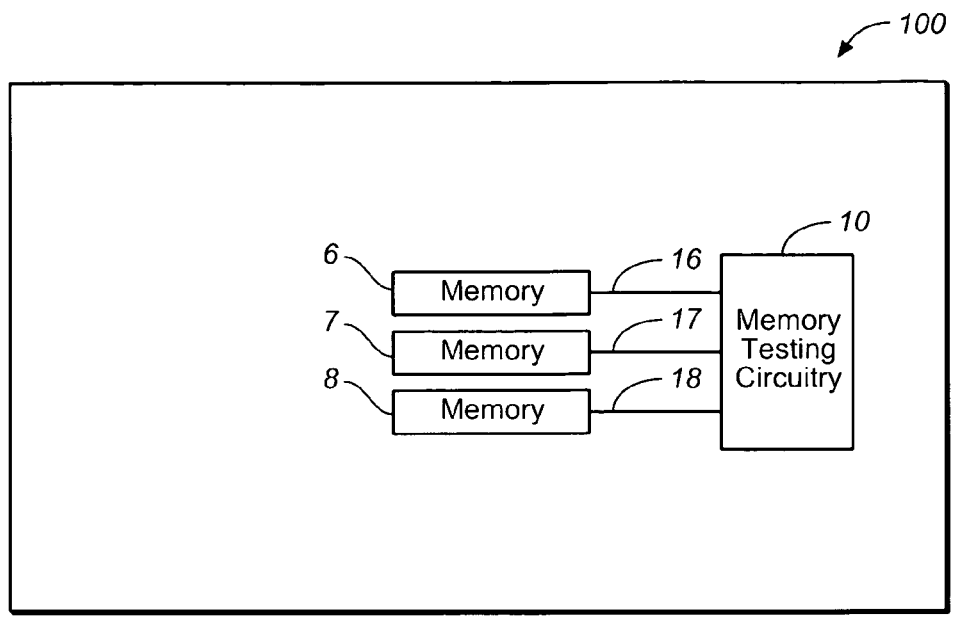
FIG. 1 is a schematic diagram of an integrated circuit including memory testing circuitry constructed according to principles of the present invention.

Referring now to the drawings and, more particularly to FIG. 1, a schematic diagram of an integrated circuit including memory testing circuitry constructed according to principles of the present invention is shown. In FIG. 1, an integrated circuit 100 such as an ASIC includes one or more memories with BISR logic. For purposes of explanation and example, FIG. 1 shows three memories with BISR logic represented by reference characters 6, 7 and 8. It should be intuitive, however, that any number of such BISR memories may be included on the integrated circuit 100, and that the elements shown in the drawings are not necessarily to scale. Outputs from the BISR memories 6, 7 and 8 are provided to memory testing circuitry 10 via input lines 16, 17 and 18, respectively.

Figure 2:
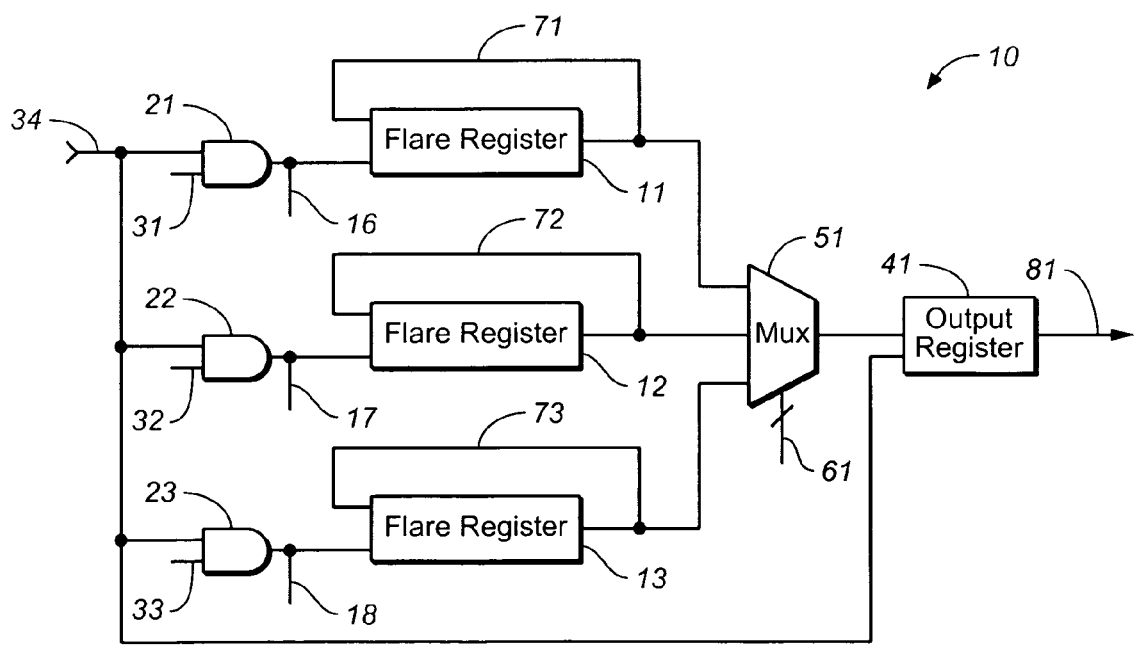
FIG. 2 is a schematic diagram of the memory testing circuitry constructed according to principles of the present invention.

Referring now to FIG. 2, a schematic diagram of the semiconductor memory testing circuitry 10 constructed according to principles of the present invention is shown. In FIG. 2, flare registers 11, 12 and 13 (which are essentially serial shift registers) store predetermined digital test data received on the input lines 16, 17 and 18, respectively. Flare registers 11, 12 and 13 also receive bit shifting clock inputs from AND gates 21, 22 and 23, respectively. According to a preferred embodiment, flare register 11 is a 48-bit register, flare register 12 is a 20-bit register, and flare register 13 is a 33-bit register. These bit storage capacities were selected to accommodate three specific memory sizes that use BISR logic. In particular, the 48-bit flare register 11 accommodates a 1 k-word memory with 4 redundant rows, the 20-bit flare register 12 accommodates a 256 word memory with 2 redundant rows, and the 33-bit flare register 13 accommodates a 512-word memory with 3 redundant rows. The bit capacities of these flare registers, however, are merely exemplary and other capacities may be used in accordance with principles of the present invention.

AND gates 21, 22 and 23 are enabled via enable signals identified by reference numerals 31, 32 and 33, respectively. In addition, AND gates 21, 22 and 23 each receive as an input a clock signal identified by reference numeral 34. An output register 41 (which preferably has the same bit storage capacity as the largest flare register) also receives clock signal 34, and is used to store digital data provided from flare registers 11, 12 and 13 through a multiplexer 51. Multiplexer 51 is enabled via an enable signal 61. Flare registers 11, 12 and 13 also include feed-back paths 71, 72 and 73, respectively, which allow digital data within the flare registers to be restored as it is output. That is, feed-back paths 71, 72 and 73 input the digital data back into the flare registers 11, 12 and 13, respectively, in the same sequence that the data is output therefrom. By restoring the data as it is output, the present invention advantageously avoids excess use of parallel load registers which would undesirably increase the BISR gate count. An output pin for the testing device of FIG. 2 is represented by reference numeral 81. Output pin 81 is strobed to provide serial output from the output register 41.

Figure 3:
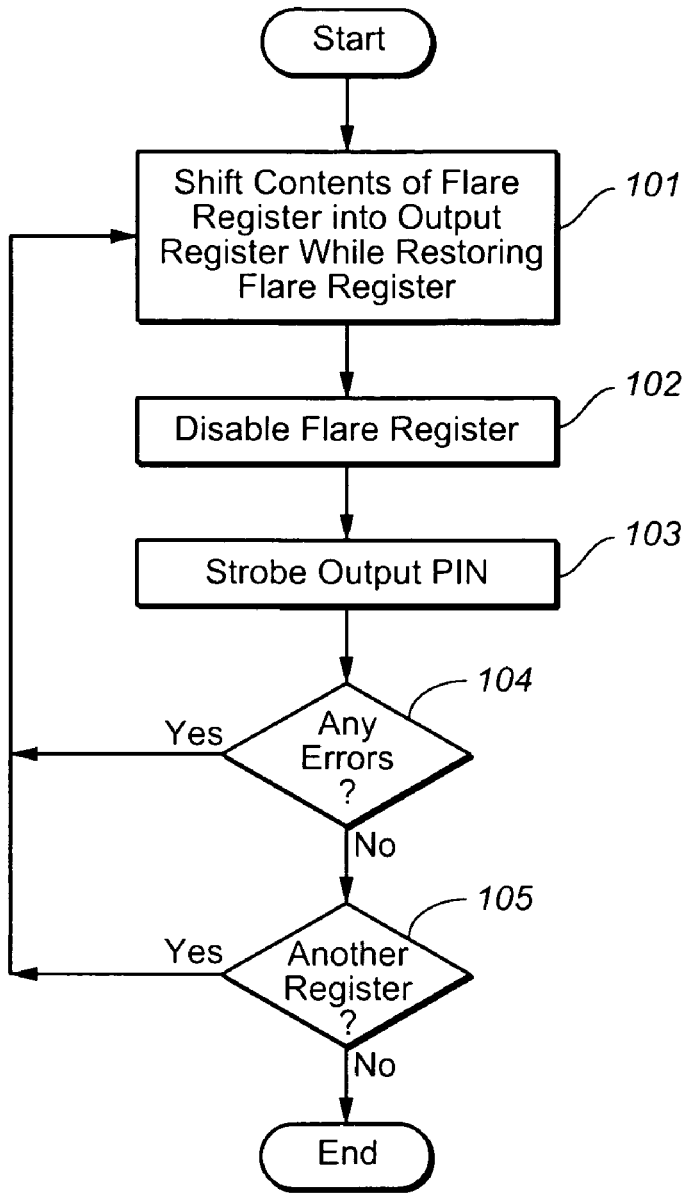
FIG. 3 is a flowchart depicting the operation of the memory testing circuitry shown in FIG. 2.

Operation of the semiconductor memory testing circuitry shown in FIG. 2 will now be described with reference to FIGS. 2 and 3. In step 101 of FIG. 3, the digital contents of the first flare register, namely flare register 11, are serially shifted into the output register 41 through multiplexer 51 via clocking inputs from AND gate 21. As the digital data is being shifted into output register 41, it is serially input back into flare register 11 via feedback path 71 in the same sequence that it is output therefrom. By restoring the original data back into flare register 11, the present invention advantageously avoids excess use of parallel load registers which undesirably increases silicon area. Moreover, the non-destructive capture of data provided by the present invention reduces testing time in the event an error is encountered. Step 101 continues until all the original data in flare register 11 is shifted into output register 41. In the embodiment of FIG. 2, this would occur after 48 clock cycles, since flare register 11 is a 48-bit register. After the contents of flare register 11 are shifted into output register 41, flare register 11 is disabled in step 102 by toggling enable signal 31 to a binary low state. Next, in step 103, output pin 81 is strobed (i.e., the contents of output register 41 are serially examined). In the embodiment of FIG. 2, output pin 81 would be strobed for 48 clock cycles during this first iteration of the process, since flare register 11 is a 48-bit register. Process flow then advances to step 104 to determine whether or not any bit error(s) are present. If any bit error(s) are observed (as would be the case for any repairable parts), process flow loops back to step 101 and the testing device restarts the testing process from the beginning. Since the data was restored back into flare register 11 in the first iteration, the next burst will capture the correct original data in output register 41. Alternatively, if no error(s) are observed in step 104, process flow advances to step 105 to determine whether or not another flare register is to be utilized in testing. In the embodiment of FIG. 2, step 105 is answered in the affirmative during this first iteration of the process, and process flow loops back to step 101 where digital data from flare register 12 is shifted into output register 41. As in the first iteration of the process, this data is input back into flare register 12 via feedback path 72 in the same sequence that it is output therefrom, so as to restore flare register 12 with its original data. The process illustrated in FIG. 3 is likewise repeated for each flare register being utilized in testing. While the embodiment of FIG. 2 illustrates three flare registers, it should be intuitive to those skilled in the art that any number of flare registers may be employed using the principles of the present invention.

Table 1 below further illustrates the operation of FIG. 2 in terms of the binary states of the various enable and clock signals. Note that Table 1 represents the operation of FIG. 2 utilizing pattern labels. This facilitates programming of the operation, as will be illustrated below. In Table 1, pattern labels 1 through 4 correspond to flare register 11, pattern labels 5 through 8 correspond to flare register 12, and pattern labels 9 through 12 correspond to flare register 13.

TABLE 1

| Pattern Identifier | Cycle Number | Clock Signal 34 | Enable Signals 31 & 61 | Enable Signals 32 & 61 | Enable Signals 33 & 61 | Output Pin 81 Strobed? |
|---|---|---|---|---|---|---|
| Pattern label 1 | 1 | 1 | 1 | 0 | 0 | N |
| . | . | . | . | . | . | . |
| . | . | . | . | . | . | . |
| Pattern label 2 | 48 | 1 | 1 | 0 | 0 | N |
| Pattern label 3 | 49 | 1 | 0 | 0 | 0 | Y |
| . | . | . | . | . | . | . |
| . | . | . | . | . | . | . |
| Pattern label 4 | 96 | 1 | 0 | 0 | 0 | Y |
| Pattern label 5 | 97 | 1 | 0 | 1 | 0 | N |
| . | . | . | . | . | . | . |
| . | . | . | . | . | . | . |
| Pattern label 6 | 116 | 1 | 0 | 1 | 0 | N |
| Pattern label 7 | 117 | 1 | 0 | 0 | 0 | Y |
| . | . | . | . | . | . | . |
| . | . | . | . | . | . | . |
| Pattern label 8 | 136 | 1 | 0 | 0 | 0 | Y |
| Pattern label 9 | 137 | 1 | 0 | 0 | 1 | N |
| . | . | . | . | . | . | . |
| . | . | . | . | . | . | . |
| Pattern label 10 | 169 | 1 | 0 | 0 | 1 | N |
| Pattern label 11 | 170 | 1 | 0 | 0 | 0 | Y |
| . | . | . | . | . | . | . |
| . | . | . | . | . | . | . |
| Pattern label 12 | 202 | 1 | 0 | 0 | 0 | Y |

Below is exemplary tester pseudo code to enable execution of the test sequence depicted in Table 1. While this code is used to explain the present invention, it should be noted that any suitable programming languages may be utilized in accordance with principles of the present invention.

FUNCTEST(OBPIN,LABEL_START(Pattern_label_1), LABEL_STOP(Pattern_label_4), "BLK_FLARE_11");
FUNCTEST(OBPIN,LABEL_START(Pattern_label_5), LABEL_STOP(Pattern_label_8), "BLK_FLARE_12");
FUNCTEST(OBPIN,LABEL_START(Pattern_label_9), LABEL_STOP(Pattern_label12), "BLK_FLARE_13").

As described herein, by restoring the digital data in the flare registers as it is output therefrom, the present invention advantageously provides a testing implementation suitable for BISR memories that enables non-destructive capture of data from multiple flare registers. The present invention also advantageously requires only a single output pin. Moreover, test time is reduced since the flare registers are restored, and minimal silicon area is required since the excess use of parallel load registers is avoided.

While this invention has been described as having a preferred design, the present invention can be further modified within the spirit and scope of this disclosure. This application is therefore intended to cover any variations, uses, of adaptations of the invention using its general principles. For example, while the present invention avoids the excess use of parallel load registers, it is contemplated that some parallel configurations may fall within the inventive scope of the present invention. Further, this application is intended to cover such departures from the present disclosure as come within known or customary practice in the art to which this invention pertains and which fall within the limits of the appended claims.

What is claimed is:

1. A circuit configuration for use in testing a semiconductor memory, comprising:
an output register for receiving digital data;
a plurality of shift registers for serially outputting the digital data to be received by the output register, wherein each of the plurality of shift registers includes a feedback path for enabling the digital data output by each individual register of the plurality of shift registers to be input back into the same individual register in a same sequence as the digital data is output from the same individual register; and
means for selecting one of the plurality of shift registers for outputting digital data to the output register.

2. The circuit configuration of claim 1, wherein each one of the plurality of shift registers has a different bit storage capacity.

3. The circuit configuration of claim 1, wherein one of the plurality of shift registers is a 48-bit register.

4. The circuit configuration of claim 1, wherein one of the plurality of shift registers is a 33-bit register.

5. The circuit configuration of claim 1, wherein one of the plurality of shift registers is a 20-bit register.

6. The circuit configuration of claim 1, wherein the output register has a bit storage capacity equal to a bit storage capacity of a largest one of the plurality of shift registers.

7. The circuit configuration of claim 1, further comprising an output pin which is strobed to examine contents of the output register.

8. The circuit configuration of claim 1, wherein the means for selecting comprises a multiplexer interposed between the output register and the plurality of shift registers.

9. The circuit configuration of claim 1, wherein the semiconductor, memory is a built-in self repair (BISR) memory.

10. The circuit configuration of claim 1, wherein the digital data, received by the output register is divided into patterns corresponding to the plurality of shift registers.

11. The circuit configuration of claim 1, wherein the semiconductor memory is a plurality of built-in self repair (BISR) memory and each of the plurality of shift registers is connected to one of the plurality of BISR memory.

12. A method for use in testing a semiconductor memory, comprising steps of:
serially outputting digital data from a shift register into an output register;

inputting the digital data back into the shift register in a same sequence as the digital data is output from the shift register; and examining the digital data in the output register.

13. The method of claim 12, wherein the shift register is disabled while the digital data in the output register is examined.

14. The method of claim 12, wherein the semiconductor memory is a built-in self repair (BISR) memory.

15. The method of claim 12 further comprising the step of determining whether any bit errors are present.

16. The method of claim 12 further comprising the step of determining whether output from an additional register is to be output into the output register.

* * * * *